(No Model.)
R. W. HUBBARD.
HUSKING IMPLEMENT.
No. 414,543. Patented Nov. 5, 1889.
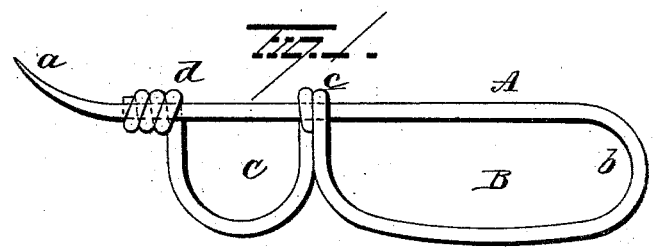
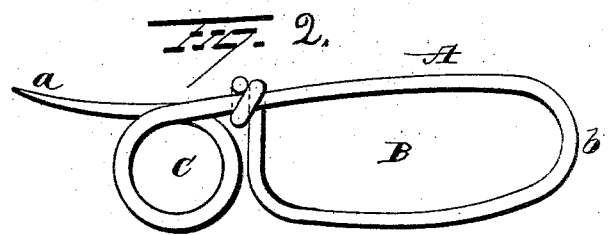
Witnesses
Inventor
Richard W. Hubbard
By his Attorney

UNITED STATES PATENT OFFICE.

RICHARD W. HUBBARD, OF ASHTABULA, OHIO.

HUSKING IMPLEMENT.

SPECIFICATION forming part of Letters Patent No. 414,543, dated November 5, 1889.

Application filed December 24, 1888. Serial No. 294,446. (No model.)

*To all whom it may concern:*

Be it known that I, RICHARD W. HUBBARD, of Ashtabula, in the county of Ashtabula and State of Ohio, have invented certain new and useful Improvements in Husking Implements; and I do hereby declare the following to be a full, clear, and exact description of the invention, such as will enable others skilled in the art to which it appertains to make and use the same.

My invention relates to an improvement in husking implements.

The object is to provide a device of this character of simple and durable construction, at a low cost, and effective in performing its work; and with this end in view it consists in certain peculiar features of construction and combinations of parts, as will be hereinafter described, and pointed out in the claims.

In the accompanying drawings, Figure 1 shows the preferred form of husking implement, and Fig. 2 represents a slightly-modified form.

A single wire is bent into shape to form the entire implement, and A represents the shank. This is preferably straight throughout its length, except at the extreme end $a$, where it is bent or curved and sharpened for penetrating or opening the husk. At the opposite end $b$ of the shank the wire is bent around and back again to form an elongated loop B for three of the fingers of the operator. After this loop is formed the wire is returned to the shank at $c$, about midway between the ends of the shank, where it is wrapped one or more times around the shank. It is then formed into a smaller loop C, of a suitable size to receive the index-finger of the operator. The wire, after this loop C is formed, is coiled around the shank at $d$, where it terminates.

In Fig. 2 a construction is shown which is in effect similar to that shown in Fig. 1. In this, however, the loop B is made for the fingers, and a smaller loop C for the index-finger is formed by one complete spiral turn of the wire between loop B and the end $a$.

Besides being durable, these devices are light and easily manipulated and may be placed on the market at a very slight initial cost.

Having fully described my invention, what I claim as new, and desire to secure by Letters Patent, is—

1. A corn-husking implement consisting of a single wire pointed at one end and bent to form an elongated loop for the reception of several fingers of the hand, and a smaller loop for one finger, the opposite end of said wire being twisted around the shank or body of the implement, behind the pointed end thereof, substantially as set forth.

2. A corn-husking implement consisting of a single wire pointed at one end and bent a short distance behind the pointed end to form a loop for the index-finger, the remaining portion of the wire being bent to form an elongated loop, the free end of the wire forming the elongated loop being twisted around the stem or body of the implement, behind the smaller loop, substantially as set forth.

In testimony whereof I have signed this specification in the presence of two subscribing witnesses.

RICHARD W. HUBBARD.

Witnesses:
B. B. SEYMOUR,
JNO. P. HUBBARD.